Dec. 13, 1966     F. S. ALLINQUANT     3,291,475
OLEOPNEUMATIC SUSPENSIONS HAVING SELF-ACTING PUMPING
Filed Feb. 12, 1965     2 Sheets-Sheet 1
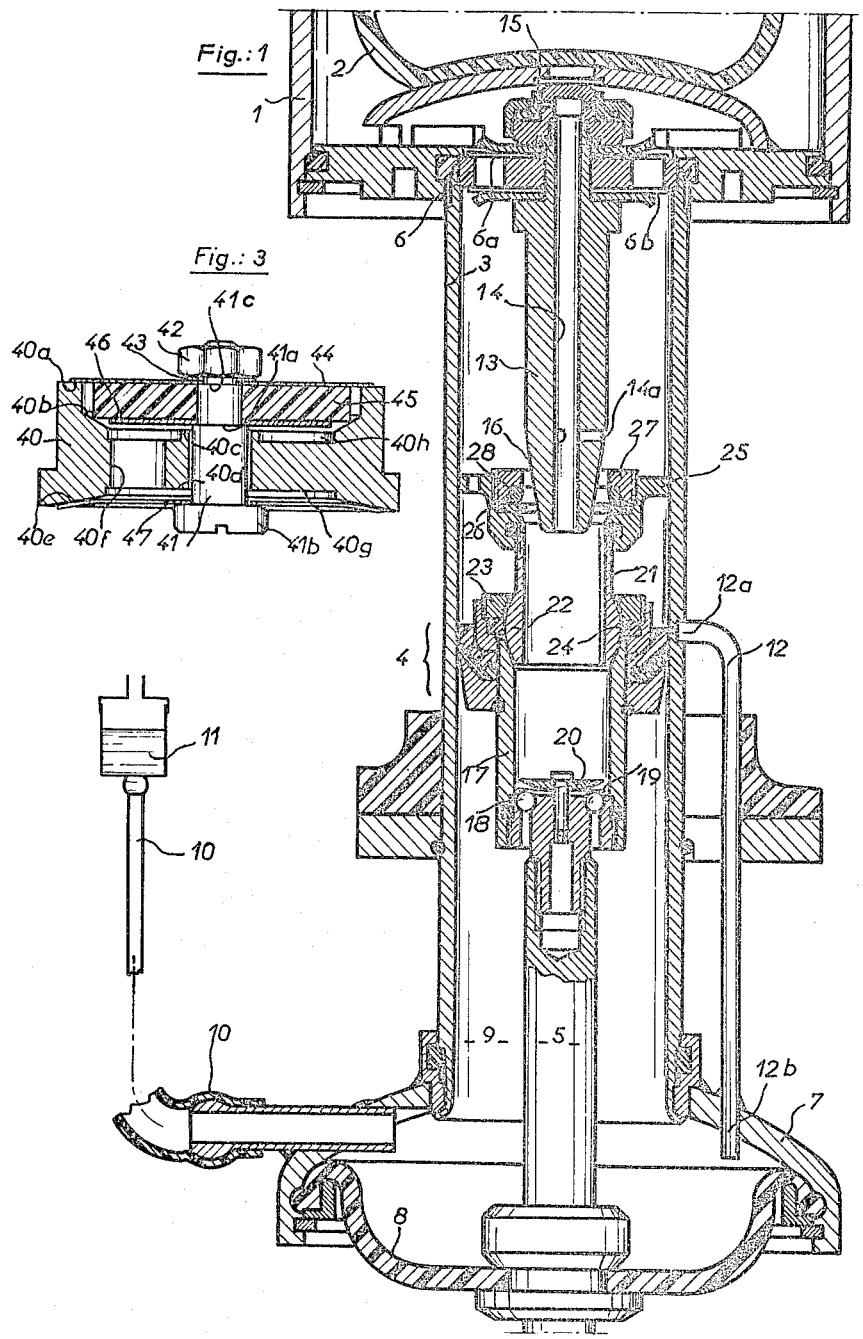
Inventor
Fernand Stanislas Allinquant
By Stevens, Davis, Miller & Mosher
Attorneys

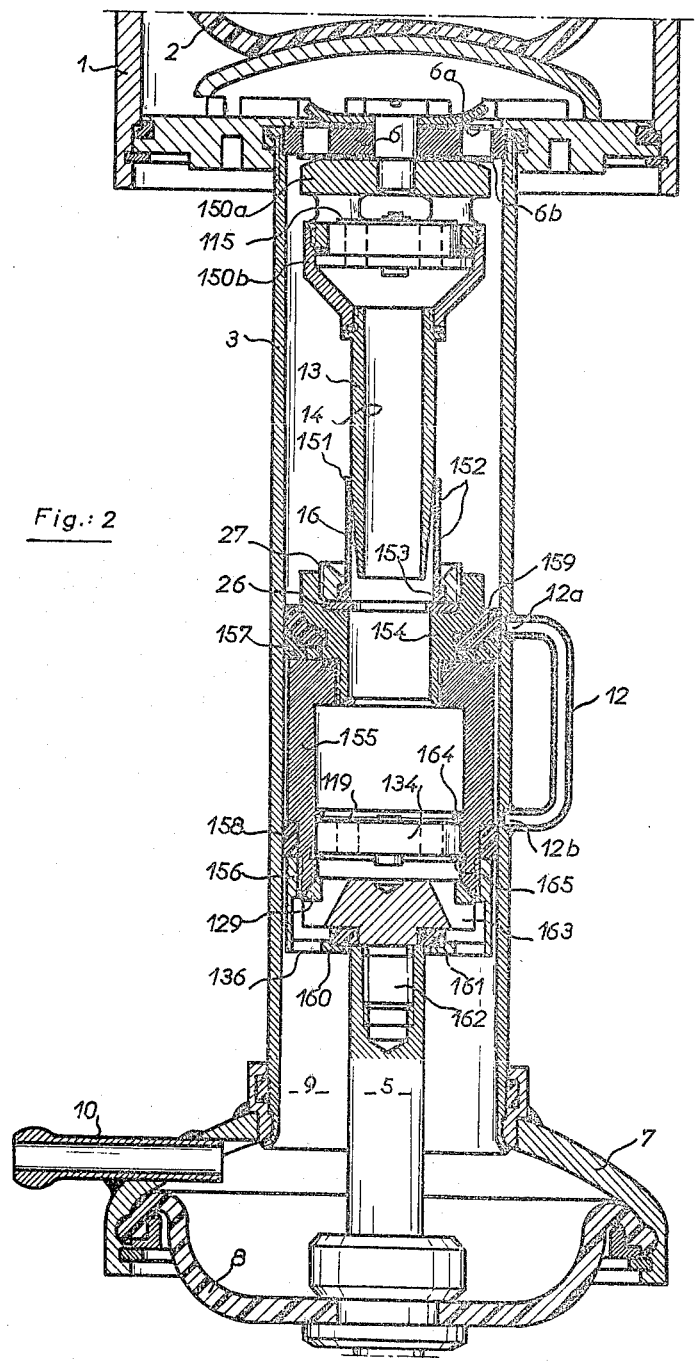
Fig.: 2

United States Patent Office 3,291,475
Patented Dec. 13, 1966

3,291,475
OLEOPNEUMATIC SUSPENSIONS HAVING SELF-ACTING PUMPING
Fernand Stanislas Allinquant, 53 Ave. le Notre, Sceaux, Seine, France
Filed Feb. 12, 1965, Ser. No. 432,181
Claims priority, application France, Mar. 28, 1964, 969,129; Sept. 29, 1964, 989,742
18 Claims. (Cl. 267—64)

The present invention relates generally to pneumatically sprung vehicle suspensions and, among such suspensions, more particularly those which comprise a pump the elements of which are mechanically connected to two parts of the vehicle which are rigid with, respectively, the wheels and the chassis (or body-shell), in such a manner as to make use of the irregular movements of the suspension in order to put fluid under pressure into reserve. The invention concerns, more especially, oleopneumatic suspensions of the kind mentioned above having trim correction, which suspensions will be referred to hereinafter as being of the kind having self-acting pumping. It is an object of the invention to provide a pump which is simple and robust as well as efficient and which will not interfere with the dampers which are provided for minor irregular movements of the suspension.

According to the invention there is employed a pump comprising a plunger piston and an associated cylinder, between which there exists axial play in the relative positions which correspond to the normal trim of the vehicle, the pumping effect thus occurring only when the clearance of the suspension exceeds an amount corresponding to said play, preferably in the direction which brings about shortening of the suspension element and in that direction only.

According to one particularly advantageous embodiment of the invention, the pump cylinder is rigid with the suspension piston, while the plunger piston, the external diameter of which diminishes towards and in the vicinity of its end, is solid with the suspension cylinder. The seal separating them is a simple resilient diaphragm having an axial aperture, the diameter of which is momentarily increased by the passage of the piston.

The plunger piston may be mounted on the partition which carries the valves used for damping purposes and the said plunger piston may even be used itself for mounting the valves. It is preferably provided with an axial bore for the escape of compressed liquid above the suspension piston and even, if so required, above the valve-carrying partition, and also with an exhaust valve which may be constituted simply by a resilient lipped washer which is deformable in one direction only.

The cylinder may likewise be used for mounting the suspension piston. It is provided with an inlet valve which possesses both a good sealing action and an adequate passage cross-section. Several examples of such valves, opening naturally under the suspension piston, will be given hereinafter.

The suspension piston may be rigidly mounted at the end of the rod with which it co-operates and consequently is of the oscillating type. In that event the pump cylinder or a part of this latter may be mounted so as to be pivotable relatively to the suspension piston, by means of a swivel joint, in such a manner that said part at least will be coaxial with the suspension cylinder.

As a modification, the suspension piston may be made to pivot on its rod by means of, for example, a swivel joint. In that event, the pump cylinder and the suspension piston may be fixed to each other in a completely rigid manner.

The trim-correcting device is with advantage provided simply by arranging a discharge conduit to by-pass the suspension piston, said conduit being constituted by, for example, an external pipe mounted on the suspension cylinder, or an internal groove in the said cylinder, the inlet cross-section of the by-pass naturally being selected so as to avoid the possibility of damage to the edge or rim of the suspension piston with which it co-operates. The pipe mounted on the suspension cylinder is with advantage shaped like the letter $c$. The lower portion of the said pipe joins the suspension cylinder at a given distance below the normal mean position of the suspension piston, this distance being selected, on the basis of the results of tests, in such a manner that both the orifices by means of which the C-shaped by-pass pipe terminates in the suspension cylinder, and not only the upper orifice, are located above the suspension piston when the suspension element is completely discharged (such as when the vehicle has been jacked up to change a wheel) or when the said element is subjected to an exceptionally irregular movement (such as, for example, the rebound after going over a hump-backed bridge).

The fluid-tightness of the pump and its silence in operation can be improved by combining a small sleeve with the resilient seal, so as to form a diaphragm carried by the pump cylinder. This small sleeve, which co-operates with the plunger piston, as does the diaphragm, is advantageously made of plastics material, such as a polyamide or a polyoxymethylene material, and formed with one or more holes; the sleeve is arranged, with minor radial play, around the piston which it surrounds when the suspension is in the normal position. The resilience of the sleeve and its radial play at the time of mounting are such that it is pressed against the external surface of the plunger piston at least during the suction stroke of the pump.

These two latter characteristics enhance the output of the pump and so make possible a reduction in the dimensions of the pump which is required for a given suspension, while allowing the designer more latitude in determining the clearance between the piston and cylinder of the pump.

It will be noted that the pump referred to above operates only at the time when the suspension sinks or "settles" by an amount which exceeds the clearance, and this simplifies the problems of trim correction.

The following description with reference to the accompanying drawings, which is given by way of non-limitative example only, will make clear the various features of the invention and the manner of carrying them into effect. In the drawings:

FIGURES 1 and 2 show, in axial section, two embodiments of suspension element according to the invention, provided respectively with an oscillating piston and with a simple sliding piston and FIGURE 3 shows, also in axial section but on a larger scale, a detail of one possible modification of the inlet valve shown in FIGURES 1 and 2.

Referring to FIGURE 1, there is shown therein an oleopneumatic suspension element with automatic trim correction constructed according to the invention, suitable for one wheel of a vehicle. This suspension element comprises a reservoir 1 containing a given amount of compressed gas, maintained by a membrane 2; a liquid fills a suspension cylinder 3 which is rigid with the body of the vehicle and with the reservoir 1. In the cylinder 3 there is displaceably mounted a piston 4 which is connected by a rod 5 to a wheel of the vehicle. The cylinder 3 also has a partition 6 forming a damper and provided, to this end, with two opposed valves 6a and 6b. The cylinder 3 is secured at its base to a cup 7 which is closed by a membrane 8 likewise fixed to the rod 5. The variable volume chamber 9 below the piston 4 is in communication, by means of a pipe 10 which may be flexible, with a tank 11 which may be partly filled with suspension liquid and which has access to the atmosphere. In the drawing the tank 11 is shown schematically on a reduced scale.

The wall of the cylinder 3 has a port 12a which the piston 4 obturates when the suspension assumes its normal trim, and here a pipe 12 is soldered to the cylinder-wall. This pipe is likewise fixed, at its other end 12b, to the cup 7 in such a manner as to by-pass the piston 4 when the latter descends below the port 12a.

The partition 6 is rigid with a plunger piston 13 which may serve as an axial pin on which to mount its various constituent parts. The plunger has an axial bore 14, as well as an exhaust valve located in its upper region, which may be constituted simply by means of a resilient seal 15 having a lip which is deformable only in the direction corresponding to ascent of liquid into the reservoir 1. In its lower region the plunger 13 has a zone 16 of evolute cross-section, which is shown in FIGURE 1 as being shaped like a truncated cone, although this shape is by no means the only possibility. The plunger 13 also has auxiliary holes 14a of smaller diameter, which connect the axial bore 14 to the outer surface of the plunger 13, in the cylindrical zone of the said surface but preferably near the evolute zone 16.

A pump cylinder in two parts co-operates with the plunger 13. A first part 17 is rigid with the rod 5 and with the piston 4 and may be used as a mounting member for the latter.

At the lower end of the part 17 there is arranged a suction-valve which, in the embodiment being described, is constituted by a plurality of balls 18 which are retained in their seats by a foil 19 kept flexed by a bar 20. This kind of valve allows, by using only simple means, the simultaneous provision of substantial passage cross-section and good fluid-tightness.

On this first part 17 there is pivotally mounted a second part 21 having at its base a part-spherical zone 22 which is held against the part 17 by a nut 23, with the interposition of a washer 24, so as to form a swivel joint. This second part 21 is rigid with a head 25 which guides the upper end of the part 21 in the cylinder 3, just as the piston 4 guides its lower end; the head 25 also carries a seal 26. This latter may have the form of a simple diaphragm gripped by means of a nut 27 between the head 25 and an intermediate member 28, the latter serving to avoid a shearing action during assembly. In its free state of rest, the diaphragm has an axial aperture with a diameter less than that of the plunger 13, or at least of the cylindrical part of the latter, and during deformation it may be guided by the rounded margins of the head 25 and the member 28, between which it is gripped.

It will be noted that when the lip of the piston 4 is level with the port 12a, a considerable axial play or clearance exists between the diaphragm 26 and the plunger 13, this clearance disappearing only in the event of an upward stroke of the piston 4 through a distance equal to the clearance which, in this reference position, separates the diaphagm 26 from the junction of the evolute and cylindrical parts of the plunger 13.

The operation of the device will be readily understood from the foregoing description, but it should be noted, however, that in the actual practice, the tank 11 will be at a height level with the cup 7 or even with the reservoir 1.

Minor oscillations of the piston 4 about its normal position of equilibrium in the vicinity of the port 12a, through which the pipe 12 opens into the cylinder 3, are in practice damped by the valves 6a and 6b alone, the play between the plunger 13 and the diaphragm 26 being considerably greater than the passage cross-section of these valves. These oscillations result in the piston 4 being brought below the port 12a periodically, which allows the suspension liquid under pressure in the reservoir 1 to pass progressively into the chamber 9, by way of the pipe 12. Since every leakage of liquid is translated into an upward movement of the piston 4, the port 12a is uncovered for increasingly brief intervals, while at the same time the pump comes into operation progressively.

In fact, every oscillation whose ascending amplitude exceeds the clearance of the pump brings about the delivery of a certain amount of liquid into the reservoir 1, by way of the exhaust valve 15, when the trim of the suspension is normal. When the suspension has sunk low, the pump naturally comes into operation when oscillations of amplitude less than the clearance take place. The withdrawal of the piston after such oscillation effects the refilling of the cylinder with liquid derived from the chamber 9 and entering by the inlet valve 18, 19, 20.

The auxiliary holes 14a provide a means of rendering progressive the equalisation of pressure between the pump cylinder 21 or 31 and the suspension cylinder 3. Experience has shown that the withdrawal of the pump-piston 13 brings about a hydraulic shock which creates a noise if the diaphragm 26 is under pressure at the instant the said piston lifts. This drawback may be avoided by means of the holes 14a or by similar means, without affecting the output of the pump substantially.

Tests have shown that an oleopneumatic suspension having automatic trim correction affected in the simple manner described provides remarkable comfort during minor oscillations of the suspension, disturbances caused by the pumping and damping operations occurring only for moderate oscillations which are associated with substantial acceleration, so that passengers will find no difference between damper action and pumping action.

Referring now to FIGURE 2, according to the modification shown therein the suspension piston 4, which is coaxial with the suspension cylinder 3, is hinged on the rod 5 by means of a swivel joint 129. In FIGURE 2, the constituent parts of the suspension element which remain unchanged as compared with the first embodiment described above retain the same reference numerals. Modified parts have the same reference numerals either increased by 100 or given a different index. Additional parts are indicated by reference numerals starting at 150.

According to this modification, the plunger 13 and the exhaust valve 115 which is arranged at the upper part of the bore 14 traversing the said plunger, are mounted beneath the partition 6 which forms a damper and separates the suspension cylinder 3 from the reservoir 1; the reservoir 1 contains compressed gas which constitutes the elastic medium of the suspension. The liquid emerging from the pump by way of the exhaust valve 115 passes inside the cylinder 3 but it will be obvious that for the plunger there could also be used a seating 150a, 150b which is entirely enclosed and is connected to the reservoir 1 by an axial hole in the bolt which is employed to mount the plunger under the partition 6.

The discharge pipe 12 has the form of a C-shaped tube. This is soldered to the suspension cylinder 3 and has openings into the latter, on the one hand, by way of an orifice 12a located immediately beneath the normal mean position of the sealing washer 159 of the suspension piston 5, and on the other hand, by way of an orifice 12b located at a suitable distance below the first orifice. This distance is less than the movement which the suspension element carries out when it is discharged completely and preferably it is also less than the exceptional movements which may be met with when driving.

The suspension piston 4 has several functions and it is composed of several parts. Fluid-tightness and guidance thereof in the cylinder 3 are ensured by, respectively, the lipped washer 159, made of rubber for example, and two annular bearings 157, 158, made of polytetrafluorethylene for example. The parts 157 and 159 are fixed to the body 155 of the piston, at the upper part thereof, by screwing down the pump-cylinder 154 which itself carries, at its upper part, the resilient diaphragm 26 and the small sleeve 151 which ensures fluid-tightness of the pump. The sleeve 151 is advantageously made of plastic material, for example a polyamide or polyoxymethylene material, and it has orifices 152. Normally it surrounds the lower end of the plunger 13 with a small radial clearance and comes to rest resiliently around the latter during the suction stroke of the pump. The sleeve 151 is fixed on the pump cylinder 154, together with the resilient diaphragm 26, by means of a shoulder 153 which is gripped by a threaded collar 27.

The bearing ring 158 is fixed in a similar manner to the lower part of the body 155 of the suspension piston 4, by screwing on a cover member 156. The member 156 is apertured at 136 and it presents at 160 a substantially axial bearing surface surrounding the rod 5 of the suspension element with a clearance compatible with the angular movement of the latter. At the upper end of said rod is mounted, for example by screwing on, a head member 162 having passages 163 and an annular supporting part 129 with a spherical outer surface which cooperates with a suitable bearing surface, likewise spherical, provided at the base of the body 155. Between the head 162 and the bearing surface 160 there is a resilient washer 161, so that the connection between the piston 4 and the rod 5 is resilient at two places.

The body 155 of the piston 4, which has a stepped bore formed longitudinally therein, also contains the inlet valve of the pump. This valve is of different construction from that shown in FIGURE 1 and includes a foil 119 co-operating with a disc 134 which is formed with a plurality of holes parallel to its axis and is retained against an annular washer 164 by a resilient keeper ring 165.

The operation of this device closely resembles that described in connection with the first embodiment. The irregular movements of the wheel in relation to the chassis or body-shell of the vehicle cause the rod 5 and the suspension piston 4 to be displaced axially in relation to the cylinder 3 and the plunger 13. When the wheel rises in relation to the vehicle, the plunger easily enters the pump cylinder 154 by reason of the reduced diameter at the lower end 16 of the plunger. The pressure inside the pump increases progressively until the resilient diaphragm 26 embraces the cylindrical portion of the plunger 13. At that moment some liquid is transferred from the interior of the pump into the cylinder 3. When the wheel descends once more, a suction stroke immediately succeeds this pumping stroke. The exhaust valve 115 closes while the inlet valve 119 opens and some liquid ascends above the suspension piston from the chamber 9 which is situated under the piston. The lower pressure existing inside the pump during the suction stroke causes the small sleeve 151 to cling closely to the plunger 13, thus extending the seal normally ensured by the resilient diaphragm 26. The holes 152 which are arranged in axially spaced stages have the effect of making progressive the rise in pressure in the pump at the end of the suction stroke, and this considerably reduces the noise.

By way of example, in one particular practical case, the pump operated with a pressure differential of the order of 20 kg./cm². The small sleeve 151 had a diameter of the order of 20 mm. and its diametral play in relation to the cylindrical portion of the piston 13 was .05 mm. Given that this sleeve is between 1 and 1.5 mm. thick, the diametral contraction under the action of lowered pressure would theoretically be .020 mm. in the absence of the plunger and of the liquid film surrounding it. There is thus effective tightening of the sleeve on the plunger, and this allows the sleeve to be made of a plastic material having a low coefficient of friction.

It will immediately be seen that the active discharge by the pump of liquid inside the suspension element by way of the C-shaped pipe 12 only occurs when the resilient seal 159 of the suspension piston 4 is located below the upper orifice 12a of the pipe 12 and above the lower orifice 12b, this arrangement serving to limit the discharge rate in the case of an exceptionally violent movement.

FIGURE 3 shows a third form of the suction valve.

According to this modification, the valve comprises a seating member 40, the central part of which forms a guide and which preferably has two spaces 40h and 40g connected by a series of holes 40f; the member 40 also has multiple bearing surfaces 40a to 40e, the respective functions of which will be disclosed hereinafter. Furthermore, the valve comprises a moving assembly which is constituted by an assembling bolt 41 sliding in the guideway provided by the member 40, a circular foil 44 which is held by a nut 42 against a shoulder 41c on the bolt 41, which the interposition of a supporting washer 43, a circular washer 45 of a deformable material, which is held by the foil 44 against a shoulder 41a, with the interposition of a supporting metal washer 46, and finally a stellate foil 47.

The foil 44, which may with advantage have a thickness of approximately 0.25 mm. when made of steel and a flat form in its free state, co-operates with the bearing surface 40a of the seating member 40.

The sealing washer 45 is preferably made from certain rubbers or from a resilient synthetic material, such as a polyurethane. It co-operates with the bearing surface 40b.

The washer 46 co-operates with the bearing surface 40c.

The foil 47 may with advantage have a thickness of approximately 0.1 mm. when made of steel and it is mounted so as to be under slight tension, which normally brings the lower circular rim of the washer 45 up against the bearing surface 40b. This foil itself co-operates with the bearing surfaces 40d and 40e.

When the cylinder 21 or 31 ascends, there is overpressure in this cylinder and lowering of the movable assembly of the inlet valve, and the foil 44 is deformed as it presses against the bearing surface 40a, with the washer 45 similarly pressing against the bearing surface 40b, until, as may happen, the washer 46 reaches the bearing surface 40c. The inlet valve is then closed and the liquid formed into the bore 14 opens the exhaust valve 15.

When the cylinder 21 or 154 descends again, and so creates a lower pressure inside the pump, the exhaust valve 15 or 115 closes and the inlet valve opens, the stellate foil 47 becoming deformed until it contacts the bearing surface 40d.

It will be noted that the resilient washer 45 is protected against varying pressure over a considerable portion of its surface and that stops limit deformation of the foils, which may be very flexible. The foil 44 also facilitates the return of the valve to its position of equilibrium.

It goes without saying that the invention is not limited to the embodiments particularly described but that it embraces, in particular, embodiments which may be obtained, within the scope of the appended claims, by the substitution of equivalent mechanical means. In particular, it is possible to replace the pipe 12 by a groove inside the cylinder, preferably having rounded edges, thus constituting the by-pass for the piston 4. The port 12a may comprise several small-diameter holes rather than one only, so as to avoid any extrusion effect which might damage the resilient lip of the oscillating piston 4. The free end of the small sleeve 151 may likewise be pointed downwards rather than upwards, an arrangement which would permit the said sleeve to ensure, at least to some extent, the sealing of the pump during the transfer of liquid to the inside of the cylinder 3, or a double sleeve may even be employed comprising two free ends and a fixing shoulder 153 situated, for example, half-way between them. If desired such a sleeve could replace the resilient diaphragm 26. Several C-shaped pipes 12 of varying heights may also be used, or equivalent grooves may be provided inside the cylinder 3. The mounting of the piston 4 shown in FIGURE 2 allows said piston to turn about its axis, such rotation helping to avoid localized wear which might otherwise occur opposite the grooves.

Finally, it would be possible for the pump piston to be made solid with the suspension piston and for the pump to operate only when the suspension element is undergoing extension movement. However, this would seem, a priori, to be more complicated.

What is claimed is:

1. A suspension element including a pneumatic device and a pump operable to increase the pressure in said device, said device comprising a suspension cylinder and piston and said pump comprising a pump cylinder and piston which are movable into relative positions in which they have a clearance between them in the axial direction, the respective cylinders and pistons being operatively associated with one another in such a way that the pump cylinder and piston occupy said clearance positions when the suspension cylinder and piston occupy their relative positions corresponding to the normal mean-level condition of the suspension element.

2. A suspension element according to claim 1, including liquid-operated means to effect automatic level correction of the element in response to variation of the effective volume of liquid available to said liquid-operated means.

3. A suspension element according to claim 1, in which the pump piston is rigidly connected with the suspension cylinder.

4. A suspension element according to claim 1, in which the pump piston is of elongated form, comprising a cylindrical portion together with a portion at one end of said pump piston, tapering towards said one end.

5. A suspension element according to claim 1, in which said pump piston has an axial bore therein for the passage of liquid into a space defined between them by said suspension cylinder and piston, for the purpose of automatic level correction, said axial bore being provided with a liquid control valve adapted to allow the delivery of liquid into said space only when said element undergoes compressive movement.

6. A suspension element according to claim 5, in which said liquid control valve comprises a resilient lipped washer.

7. A suspension element according to claim 4, in which said pump cylinder carries a flexible diaphragm for sealing engagement with said pump piston during relative movement of said pump cylinder and piston into and out of said clearance positions, said diaphragm being formed with a central aperture to receive said pump piston, which aperture is of a diameter less than the diameter of said cylindrical portion.

8. A suspension element according to claim 1, in which said pump cylinder carries a flexible sleeve for sealing engagement with said pump piston during relative movement of said pump cylinder and piston into and out of said clearance positions, said sleeve being dimensioned for coaxial engagement with said pump piston, substantially without play.

9. A suspension element according to claim 8, in which the sleeve is secured to said pump cylinder at one end thereof and has its other end free for engagement with the surface of said pump piston, towards which said free end is directed.

10. A suspension element according to claim 8, in which the sleeve is made of a material selected from the group consisting of polyamide and polyoxymethane based plastics.

11. A suspension element according to claim 5, in which said pump piston is formed with at least one radial hole communicating with said axial bore therein.

12. A suspension element according to claim 8, in which said sleeve is formed with at least one radial hole.

13. A suspension element according to claim 1, including a fluid reservoir and a fluid discharge passage to discharge fluid derived from said reservoir into the suspension cylinder in the vicinity of and below the mean normal position of the suspension piston, so as to cause relative movement of said suspension cylinder and piston to return them to their normal relative positions when they are displaced therefrom by operation of said pump.

14. A suspension element according to claim 13, said suspension cylinder being formed with two orifices below the normal position of the suspension piston, one such orifice being located immediately adjacent said position, said passage extending between said two orifices.

15. A suspension element according to claim 13, which includes a pipe mounted externally of said suspension cylinder, to provide said passage.

16. A suspension element according to claim 1, in which said suspension piston is mounted for transverse oscillatory movement in said suspension cylinder, said pump cylinder being mounted coaxially with said suspension piston and a swivel joint being provided, connecting said pump cylinder with said suspension piston while allowing transverse oscillatory movement of said suspension piston.

17. A suspension element according to claim 1, which includes an inlet valve to control the supply of fluid to said pump cylinder, said inlet valve comprising a plurality of balls, seatings for said balls and a resilient member urging said balls into valve-closing engagement with said seatings.

18. A suspension element according to claim 1, which includes an inlet valve to control the supply of fluid to said pump cylinder, said inlet valve comprising a flexible washer, a seating therefor, a rigid washer supporting said resilient washer over the greater part of its surface and resilient members urging said flexible washer into valve-closing engagement with said seating.

No references cited.

ARTHUR L. LA POINT, *Primary Examiner.*

R. M. WOHLFARTH, *Assistant Examiner.*